United States Patent
Pham et al.

(10) Patent No.: US 6,318,101 B1
(45) Date of Patent: Nov. 20, 2001

(54) METHOD FOR CONTROLLING AN ELECTRONIC EXPANSION VALVE BASED ON COOLER PINCH AND DISCHARGE SUPERHEAT

(75) Inventors: Ba-Tung Pham, Chassieu; Cretin Pascal, Trevoux, both of (FR)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/526,045

(22) Filed: Mar. 15, 2000

(51) Int. Cl.[7] ........................................ F25B 4/04
(52) U.S. Cl. ............................................. 62/225
(58) Field of Search ..................... 62/225, 224, 222, 62/204, 205, 206; 236/67

(56) References Cited

U.S. PATENT DOCUMENTS

| | | | |
|---|---|---|---|
| 4,879,879 | * | 11/1989 | Marsala t al. ........................... 62/202 |
| 5,632,154 | * | 5/1997 | Sibik et al. ............................. 62/99 |
| 5,691,466 | * | 11/1997 | Lawrence et al. ................... 73/29.05 |
| 5,735,134 | * | 4/1998 | Liu et al. .............................. 62/230 |
| 5,806,327 | * | 9/1998 | Lord et al. ............................. 62/115 |
| 5,809,794 | * | 9/1998 | Sibik et al. ............................ 62/204 |
| 5,899,084 | * | 5/1999 | Franaszek et al. .................... 62/209 |
| 6,077,160 | * | 6/2000 | Franaszek et al. ................... 454/292 |
| 6,094,930 | * | 8/2000 | Zeng et al. ......................... 62/324.6 |
| 6,138,466 | * | 10/2000 | Lake et al. ............................ 62/199 |
| 6,148,628 | * | 11/2000 | Reason et al. ........................ 62/223 |
| 6,196,012 | * | 3/2001 | Reason et al. ........................ 62/225 |

* cited by examiner

*Primary Examiner*—Teresa Walberg
*Assistant Examiner*—Daniel Robinson
(74) *Attorney, Agent, or Firm*—Wall Marjama & Bilinski

(57) ABSTRACT

An electronic expansion valve (EXV) used in a refrigeration cycle for a heat pump or chiller is controlled to maintain minimum pinch for ensuring proper flooded cooler exchange performance by monitoring the delta temperature between the cooler fluid and the saturated suction temperature. The discharge superheat is monitored to protect the compressor from liquid slugging. If the discharge superheat is lower than the expected value, the EXV opening is adjusted. A controller monitors certain system variables which are used to determine the optimal position of the EXV to optimize the system performance, the proper discharge superheat value, and the appropriate refrigerant charge.

3 Claims, 4 Drawing Sheets

METHOD FOR CONTROLLING AN ELECTRONIC EXPANSION VALVE BASED ON COOLER PINCH AND DISCHARGE SUPERHEAT

FIELD OF THE INVENTION

This invention pertains to the field of compressors used in chillers and/or heat pumps, and in particular, to using an electronic expansion valve to control cooler pinch and to protect discharge superheat.

BACKGROUND OF THE INVENTION

Heat pump systems use a refrigerant to carry thermal energy between a relatively hotter side of a circulation loop to a relatively cooler side of the circulation loop. Compression of the refrigerant occurs at the hotter side of the loop, where a compressor raises the temperature of the refrigerant. Evaporation of the refrigerant occurs at the cooler side of the loop, where the refrigerant is allowed to expand, thus causing a temperature drop because heat is necessary for expansion. Thermal energy is added to the refrigerant on one side of the loop and extracted from the refrigerant on the other side, due to the temperature differences between the refrigerant and the indoor and outdoor air, respectively, to make use of the outdoor air as either a thermal energy source or a thermal energy sink.

The process is reversible, so the heat pump can be used for either heating or cooling. Residential heating and cooling units are bidirectional, in that suitable valve and control arrangements selectively direct the refrigerant through indoor and outdoor heat exchangers so that the indoor heat exchanger is on the hot side of the refrigerant circulation loop for heating and on the cool side for cooling. A circulation fan passes indoor air over the indoor heat exchanger and through ducts leading to the indoor space. Return ducts extract air from the indoor space and bring the air back to the indoor heat exchanger. A fan likewise passes ambient air over the outdoor heat exchanger, and releases heat into the open air, or extracts available heat therefrom.

These types of heat pump systems operate only if there is an adequate temperature difference between the refrigerant and the air at the respective heat exchanger to maintain a transfer of thermal energy. For heating, the heat pump system is efficient provided the temperature difference between the air and the refrigerant is such that the available thermal energy is greater than the electrical energy needed to operate the compressor and the respective fans. For cooling, the temperature difference between the air and the refrigerant generally is sufficient, even on hot days. Air conditioners, or chillers, work similarly to heat pumps but only transfer heat from indoors to outdoors. In most other aspects, the cycles are the same.

When the refrigerant passes from the condenser to the evaporator, it passes through a valve such as an electronic expansion valve (EXV). The main flow control in the system is this expansion valve which permits the refrigerant to expand from the high pressure of the condenser to the lower pressure in the evaporator. The expansion causes part of the liquid to evaporate, thereby cooling the rest of the liquid to the evaporator temperature. The refrigerant level inside the evaporator is also controlled by the EXV, withe the refrigerant level determined based on sensor inputs. One sensor input is from a heat sensor inside the evaporator while a second input is from the saturated suction temperature. Based on these two inputs, an estimate of the liquid level inside the evaporator is obtained. A lot of problems arise from mounting the heat sensor inside the evaporator and from the lack of precision in using these two inputs to determine the liquid level within the evaporator.

SUMMARY OF THE INVENTION

Briefly stated, an electronic expansion valve (EXV) used in a refrigeration cycle for a heat pump or chiller is controlled to maintain minimum pinch for ensuring proper flooded cooler exchange performance by monitoring the delta temperature between the cooler fluid and the saturated suction temperature. The discharge superheat is monitored to protect the compressor from liquid slugging. If the discharge superheat is lower than the expected value, the EXV opening is adjusted. A controller monitors certain system variables which are used to determine the optimal position of the EXV to optimize the system performance, the proper discharge superheat value, and the appropriate refrigerant charge.

According to an embodiment of the invention, a method for controlling an electronic expansion valve in a refrigerant cycle system includes the steps of ensuring proper flooded cooler exchange performance by monitoring a change in temperature between a fluid in said cooler and a saturated suction temperature of the system, protecting a compressor of the system by monitoring a discharge superheat of the system, and correcting a size of an opening of the electronic expansion valve when the discharge superheat is lower than a predetermined value.

According to an embodiment of the invention, a method for controlling an electronic expansion valve in a refrigerant cycle system includes the steps of determining a saturated suction temperature (SST) for the system; determining a saturated discharge temperature (SDT) for the system; determining a cooler fluid temperature (CFT) for the system; determining a saturated condensing temperature (SCT) for the system; determining pinch as the CFT minus the SST; determining pinch error as the pinch minus a pinch setpoint; determining pinch rate as a current pinch minus a pinch of a specified time ago; determining discharge superheat as the SDT minus the SCT; determining discharge superheat error as the discharge superheat minus a discharge superheat setpoint; determining a discharge superheat rate as a current discharge superheat minus a discharge superheat of a specified time ago; setting a deadband of a specified temperature; and controlling a movement of the electronic expansion valve based on the pinch error, the pinch rate, the discharge superheat error, the discharge superheat rate, and the deadband.

According to an embodiment of the invention, an apparatus for controlling an electronic expansion valve in a refrigerant cycle system includes means for determining a pinch of the system; means for determining a pinch error of the system; means for determining a pinch rate of the system; means for determining a discharge superheat of the system; means for determining a discharge superheat error of the system; means for determining a discharge superheat rate of the system; means for setting a deadband of a specified temperature; and means for controlling a movement of the electronic expansion valve based on the pinch error, the pinch rate, the discharge superheat error, the discharge superheat rate, and the deadband.

DETAILED DESCRIPTION OF THE INVENTION

Figure 1:
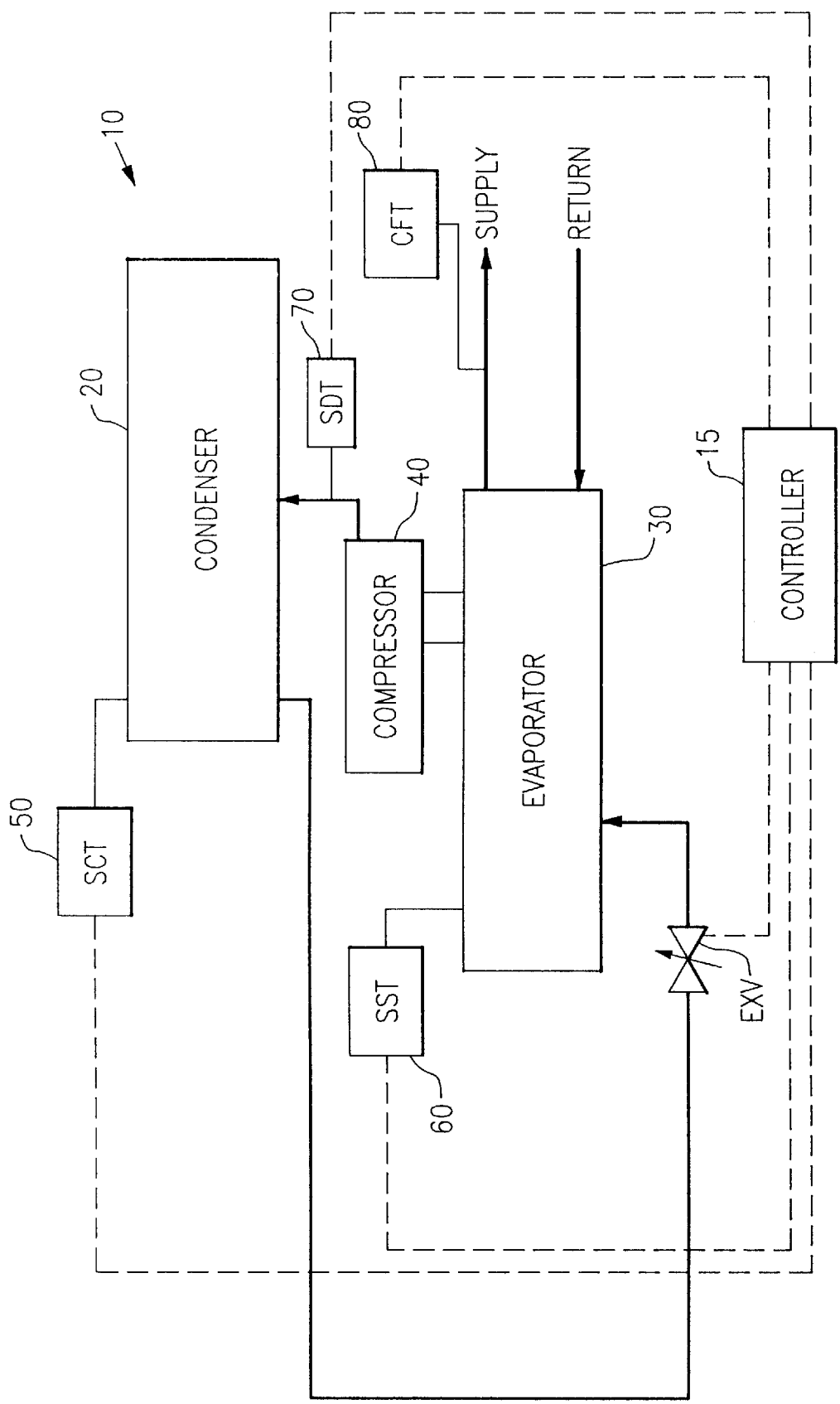
FIG. 1 shows a schematic diagram of a refrigeration system.

Referring to FIG. 1, a basic refrigeration system 10 includes a condenser 20 fluidly connected to an evaporator 30 through an electronic expansion valve EXV. Valve EXV is controlled by a controller 15. Evaporator 30 is fluidly connected to condenser 20 through a compressor 40. Although only one compressor is shown, it is known in the art to connect more than one compressor in parallel in the same circuit. Return water (or air) enters evaporator 30 where heat is transferred to a refrigerant. Although only one refrigerant circuit is shown, it is known in the art to use two independent refrigerant circuits. Cooler supply water (or air) is circulated as necessary for cooling. A transducer or thermistor 80 reads the cooler fluid temperature (CFT) which is received by controller 15. A pressure transducer 50 reads the saturated condensing pressure of the refrigerant and converts the reading to the saturated condensing temperature (SCT) at controller 15. A pressure transducer 60 reads the saturated suction pressure of the refrigerant and converts the reading to the saturated suction temperature (SST) at controller 15. A discharge gas thermistor sensor 70 provides the saturated discharge temperature (SDT) to controller 15. Alternatively, a pressure transducer reads the saturated discharge pressure of the refrigerant and converts the reading to the SDT. Pressure transducers are frequently used because they are more accurate than known means for measuring the temperature directly.

Pinch is defined as the CFT minus the SST. Discharge superheat (DSH) is defined as the SDT minus the SCT. In the method of the present invention, these variables are used to control the movement of the EXV and thus control the refrigerant flow within system 10. The EXV is preferably controlled to maintain minimum pinch for ensuring proper cooler exchange performance by monitoring the delta temperature between the cooler fluid and the saturated suction temperature. Opening the EXV normally decreases the cooler pinch, thus increasing the cooler exchange performance. However, opening the EXV too much causes a drop in the discharge superheat, low oil pressure, and reduced refrigerant flow. The present invention therefore has two goals, one of maintaining a small cooler pinch, and the other of protecting the discharge superheat.

Figure 2A:
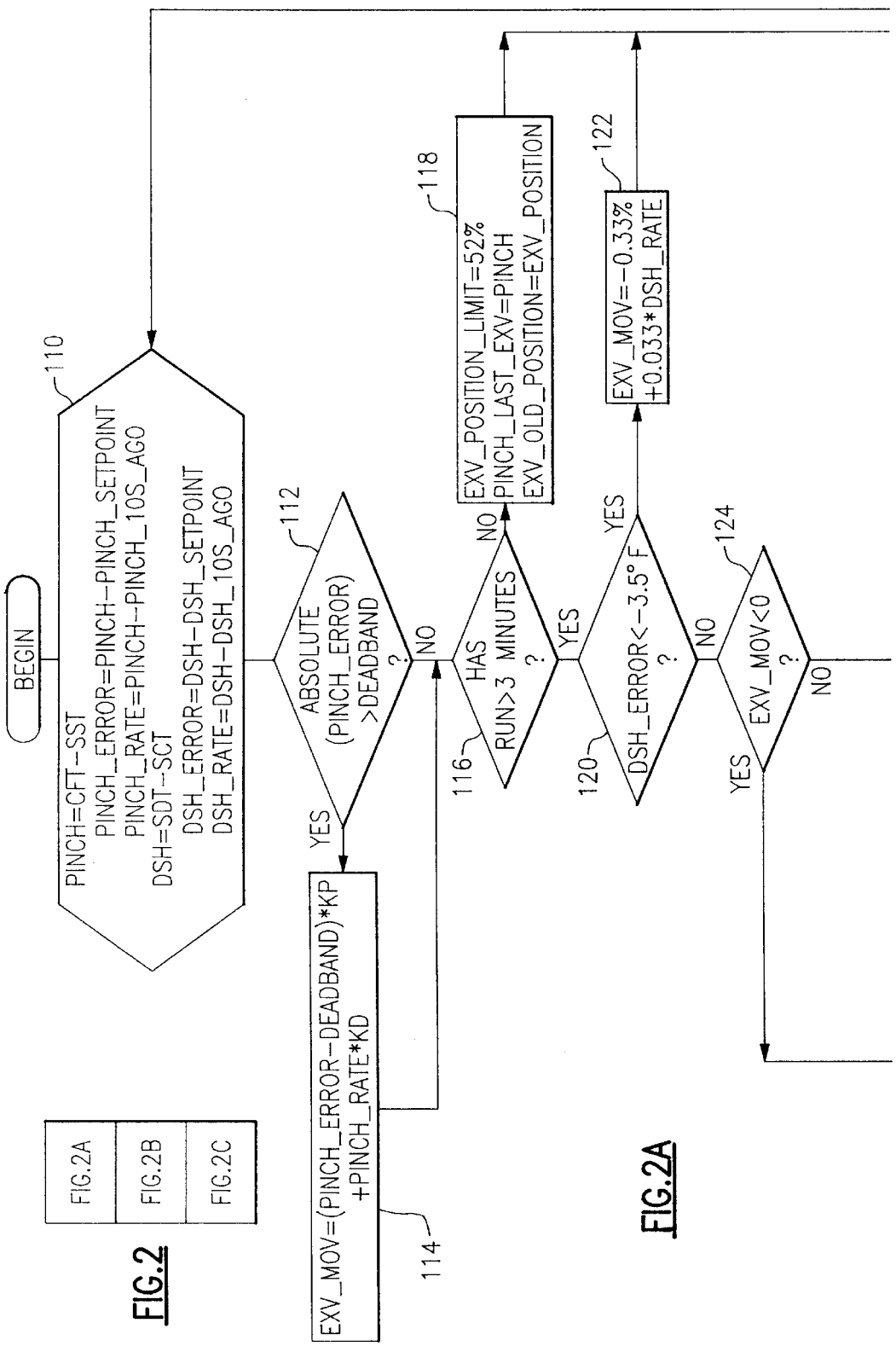
FIG. 2 shows a modified flow chart of the method of the present invention.
Figure 2B:
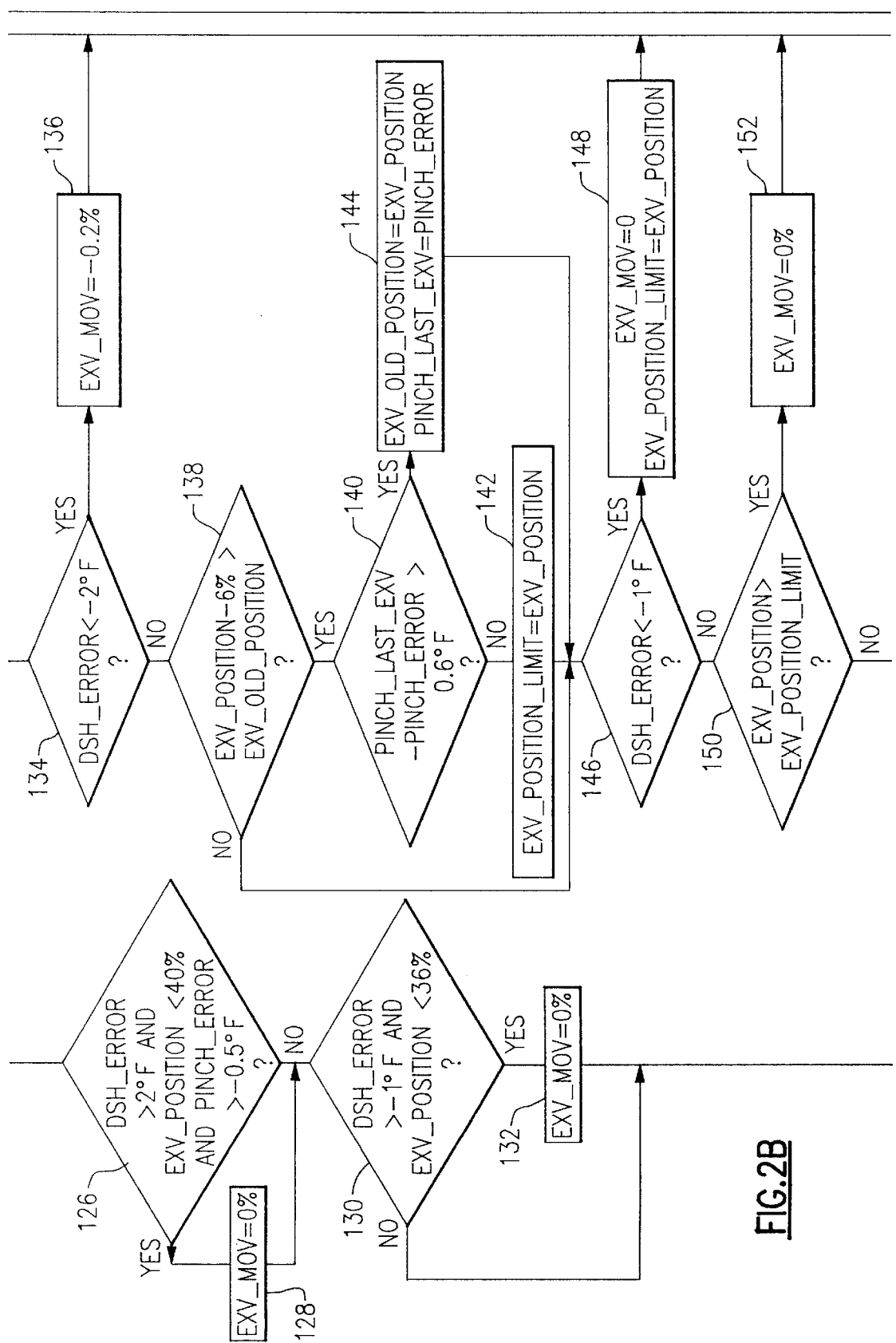
Figure 2C:
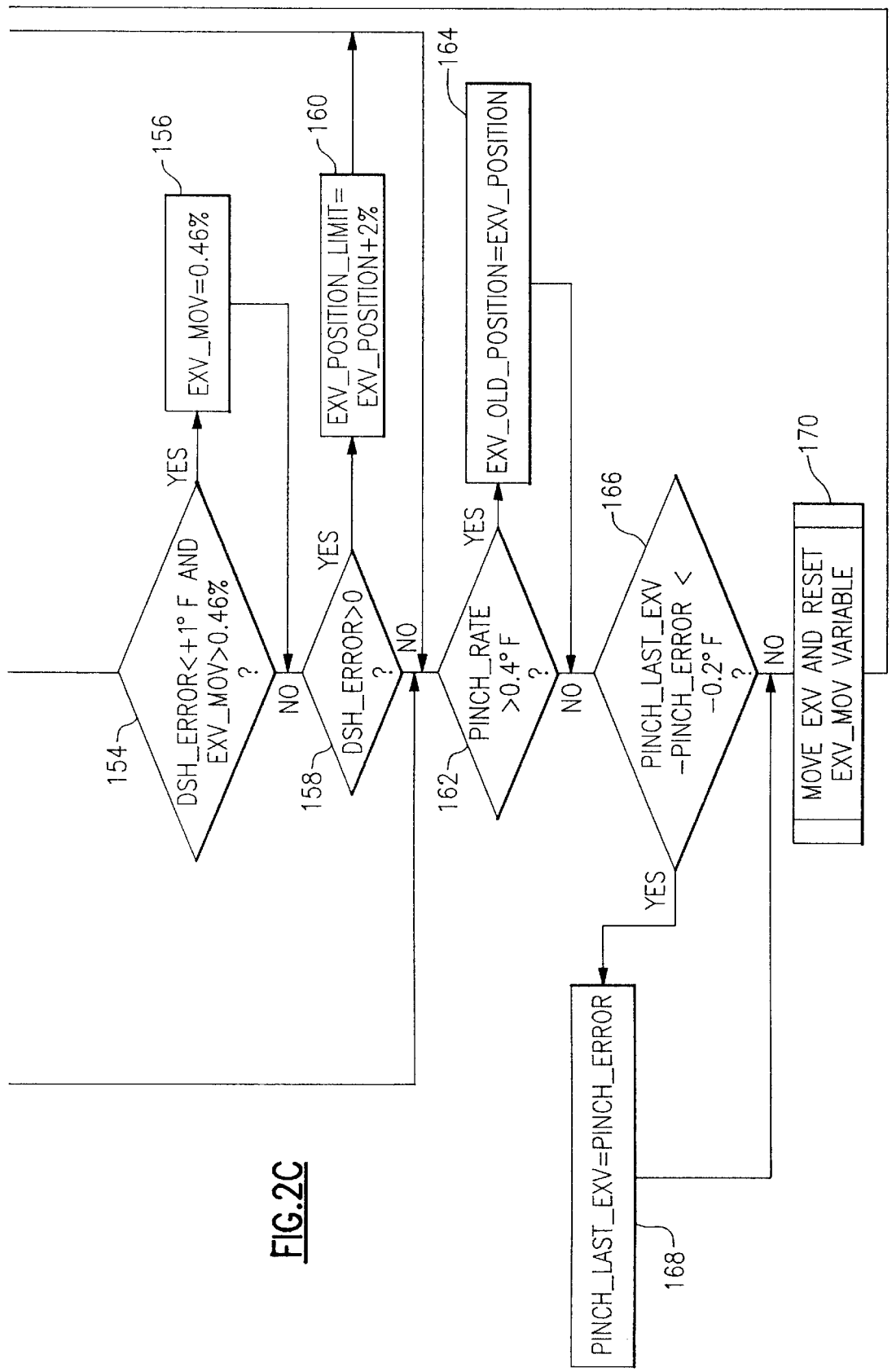

Referring to FIG. 2, an initialization step 110 sets values for various variables used in the method of the present invention. The cycle of the method runs every 10 seconds, although any reasonable cycle time can be used. The values for CFT, SST, SDT, and SCT are read by controller 15 (FIG. 1). PINCH is defined as the CFT minus the SST, PINCH_ERROR is defined as the PINCH minus the PINCH_SETPOINT (programmed into the system controller by the manufacturer, installer, or user), and PINCH_RATE is defined as the current PINCH minus the PINCH of 10 seconds ago. DSH is defined as the SDT minus the SCT, DSH_ERROR is defined as the DSH minus the DSH_SETPOINT (programmed into the system controller by the manufacturer, installer, or user), and DSH_RATE is defined as the current DSH minus the DSH of 10 seconds ago.

In step 112, the absolute value of PINCH_ERROR is compared to the DEADBAND. When the pinch error is less than the "deadband", no movement is applied to the EXV. The deadband is used to avoid instability due to the sensors' imprecision. The value for the deadband is optionally set by the user, but in the embodiment used as the example for this invention, the deadband is set to 0.4° F. If the absolute value of PINCH_ERROR is greater than the DEADBAND, EXV_MOV is set to (PINCH_ERROR minus DEADBAND) times KP added to PINCH_RATE times KD in step 114. Otherwise, no change is made to the value of EXV_MOV. KP is the proportional gain and is multiplied by the pinch error to obtain the proportional action. In this embodiment, KP is 0.33 percent per degree F. KD is the derivative gain and it multiplied by the rate of change in the pinch error to obtain the derivative action. For this embodiment, KD is 0.33 percent per degree F per 10 seconds. The sum of the proportional and derivative actions represents the EXV movement in percent. A negative result corresponds to a closing movement while a positive result corresponds to an opening movement.

Then, in step 116, the system clock is checked to see if the system has been running for more than 3 minutes. If not, EXV_POSITION_LIMIT is set to 52% of the total possible range of movement of the EXV in step 118 and the control passes to step 162. That is, the discharge superheat protection is bypassed during the startup procedure which can take some time, and the EXV position limit is reinitialized at 52%. If the system has been running for more than three minutes, DSH_ERROR is checked in step 120, and if less than −3.5° F., EXV_MOV is set to −0.33% plus 0.033 times DSH_RATE in step 122 and control passes to step 162. If not, EXV_MOV is checked in step 124 to see if it is less than zero.

If EXV_MOV is less than zero, i.e., if the pinch is less than the setpoint, in step 126 the controller checks to see if DSH_ERROR is greater than 2° F. and EXV_POSITION is less than 40% and PINCH_ERROR is greater than −0.5° F., and if so, EXV_MOV is set to 0% in step 128. If not, in step 130 the controller checks to see if DSH_ERROR is greater than —1° F. and EXV_POSITION is less than 36%, and if so, EXV_MOV is set to 0% in step 132. Otherwise, control passes to step 162. If EXV_MOV is not less than zero in step 124, the controller checks to see if DSH_ERROR is less than −2° F. in step 134, and if so, EXV_MOV is set to −0.2%, after which control passes to step 162. Otherwise, the controller checks to see if EXV_POSITION minus 6% is greater than EXV_OLD_POSITION in step 138. That is, the controller checks to see if a real decrease in cooler pinch (defined in step 140 as being a change of more than 0.6° F.) is obtained whenever there is 6% of EXV opening movement, because if a real decrease is not obtained, the EXV is opened at its optimal position. If EXV_POSITION minus 6% is not greater than EXV_OLD_POSITION in step 138, control passes to step 146. If it is greater, the controller checks in step 140 to see if PINCH_LAST_EXV minus PINCH_ERROR is greater than 0.6° F., and if not, EXV_POSITION_LIMIT is set to EXV_POSITION in step 142. If PINCH_LAST_EXV minus PINCH_ERROR is not greater than 0.6° F., EXV_OLD_POSITION is set to EXV_POSITION and PINCH_LAST_EXV is set to PINCH_ERROR in step 144.

Then in step 146, the controller checks to see if DSH_ERROR is less than −1° F., and if so, EXV_MOV is set to 0% and EXV_POSITION_LIMIT is set to EXV_POSITION in step 148, after which control passes to step 162. If not, the controller checks to see if EXV_POSITION is greater than EXV_POSITION_LIMIT, and if so, EXV_MOV is set to 0% in step 152 and control passes to step 162. If EXV_POSITION is not greater than EXV_POSITION_LIMIT, the controller checks to see if DSH_ERROR is less than 1° F. and EXV_MOV is greater than 0.46% is step 154, and if so, EXV_MOV is set to 0.46% in step 156. Otherwise, the controller checks to see if DSH_ERROR is greater than zero in step 158, and if so, EXV_POSITION_LIMIT is set to EXV_POSITION plus 2% in step 160.

If DSH_ERROR is not greater than zero, the controller checks to see if PINCH_RATE is greater than 0.4° F. in step 162, which indicates that operating conditions may have changed. If so, EXV_OLD_POSITION is set to EXV_POSITION in step 164. If not, the controller checks to see if PINCH_LAST_EXV minus PINCH_ERROR is less than −0.2° F. in step 166, and if so, PINCH_LAST_EXV is set to PINCH_ERROR is step 168. Then, in step 170, the EXV is moved and the EXV_MOV variable is reset to zero. The cycle then begins again.

According to the present invention, the EXV is controlled to maintain minimum pinch to ensure the cooler exchange performance by looking at the change in temperature between the CFT and the SST. The EXV opening movement normally decreases the cooler pinch and thus increase the cooler exchange performance.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

We claim:

1. A method for controlling an electronic expansion valve in a refrigerant cycle system, comprising the steps of:

ensuring proper flooded cooler exchange performance by monitoring a change in temperature between a fluid in said cooler and a saturated suction temperature of said system;

protecting a compressor of said system by monitoring a discharge superheat of said system; and correcting a size of an opening of said electronic expansion valve when said discharge superheat is lower than a predetermined value.

2. A method for controlling an electronic expansion valve in a refrigerant cycle system, comprising the steps of:

determining a saturated suction temperature (SST) for said system;

determining a saturated discharge temperature (SDT) for said system;

determining a cooler fluid temperature (CFT) for said system;

determining a saturated condensing temperature (SCT) for said system;

determining pinch as said CFT minus said SST;

determining pinch error as said pinch minus a pinch setpoint;

determining pinch rate as a current pinch minus a pinch of a specified time ago;

determining discharge superheat as said SDT minus said SCT;

determining discharge superheat error as said discharge superheat minus a discharge superheat setpoint;

determining a discharge superheat rate as a current discharge superheat minus a discharge superheat of a specified time ago;

setting a deadband of a specified temperature; and controlling a movement of said electronic expansion valve based on said pinch error, said pinch rate, said discharge superheat error, said discharge superheat rate, and said deadband.

3. Apparatus for controlling an electronic expansion valve in a refrigerant cycle system, comprising:

means for determining a pinch of said system;

means for determining a pinch error of said system;

means for determining a pinch rate of said system;

means for determining a discharge superheat of said system;

means for determining a discharge superheat error of said system;

means for determining a discharge superheat rate of said system;

means for setting a deadband of a specified temperature; and means for controlling a movement of said electronic expansion valve based on said pinch error, said pinch rate, said discharge superheat error, said discharge superheat rate, and said deadband.

\* \* \* \* \*